Feb. 14, 1961  R. NOACK ET AL  2,971,446
LENS SHUTTERS

Filed April 21, 1958  3 Sheets-Sheet 1

INVENTOR.
Rolf Noack
and
Heinz Schulze

Feb. 14, 1961          R. NOACK ET AL          2,971,446
                         LENS SHUTTERS
Filed April 21, 1958                        3 Sheets-Sheet 3

INVENTOR.
Rolf Noack
and
Heinz Schulze

United States Patent Office 2,971,446
Patented Feb. 14, 1961

2,971,446

LENS SHUTTERS

Rolf Noack and Heinz Schulze, Dresden, Germany, assignors to VEB Kamera- und Kinowerke Dresden Filed Apr. 21, 1958, Ser. No. 729,809

3 Claims. (Cl. 95—42)

This invention relates to a lens shutter for photographic cameras, which is provided with sectors rotatably secured to a bearing ring and a driving ring and which includes also a setting ring cooperating with an arm of the bearing ring.

When in known arrangements of this kind running-off of the setting ring is delayed due to auto-release, the sectors close with corresponding slowness, which involves troubles with respect to proper functioning of monocular mirror reflex cameras for which this type of shutter is particularly intended.

Before the shutter of monocular reflex cameras is opened by means of an additional opening device for viewing the object to be taken, the film must be covered to prevent wrong exposures by incident light. Cameras of this class employ for this purpose built-in means connected with the film feed and actuated thereby. Such designs with gear connections between the film feed and the shutter mechanism suffer, however, from serious drawbacks, particularly with respect to the installation of interchangeable lens shutters, since between the shutter and the light-covering flaps additional gear connections are required for automatically covering the light-sensitive material at disconnection of the shutter from the camera.

These disadvantages can be avoided according to the invention by attaching to the setting ring a spring lever cooperating with the arm of the bearing ring and provided with switches in its course. The secondary motion of the spring lever caused thereby proceeds preferably vertically to the turning of the setting ring, regarded as primary motion, and immediately at the beginning of the run of the setting ring serves for ensuring separation of the connection between the setting and bearing rings and thereby rapid closing of the shutter aperture by the sectors. The setting ring, furthermore, possesses cams projecting from the plane thereof and being connected with a ramlike member which transmits its motion to the light-covering flap or to a finder mirror taking over the function of this flap. The ramlike member preferably passes in axial direction through the interior of the shutter housing and is subject to the action of a spring tending to keep it continually in touch with the setting ring or said cams.

The shutter according to the invention possesses also an advantageous geared connection of the light-covering flap with the shutter mechanism, which is of simple construction and reliable in action.

One form of the invention is illustrated in the accompanying drawings, wherein:

Figure 1 is a view of the shutter when run down;

Fig. 2, a view of the shutter when set;

Figure 2:
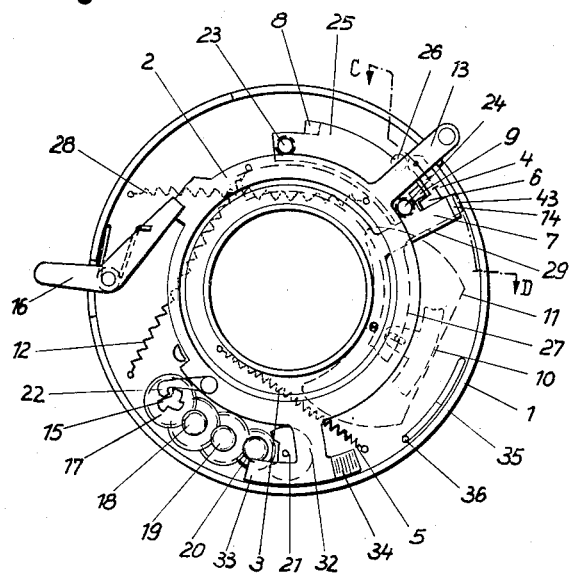
Figure 6:
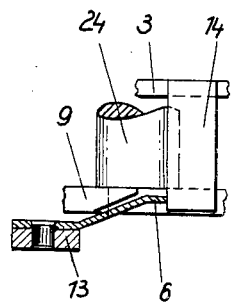
Figure 7:
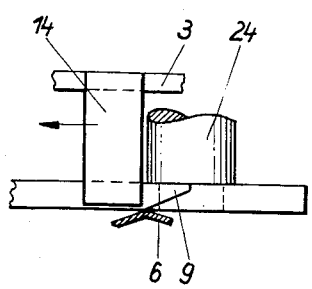
Figure 8:
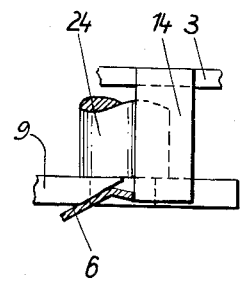

Fig. 6, a section of the shutter according to Fig. 2 on the line C—D;

Figs. 7 and 8 show details of the mode of operation 30 of a switch; and

Figure 9:
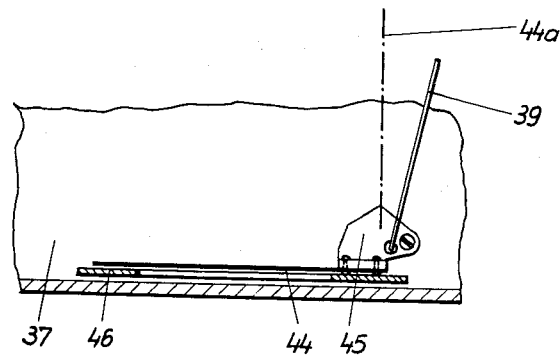

Fig. 9 shows the geared connection between the shutter mechanism and the film cover plate.

In the shutter housing 1 the setting ring 2, the bearing ring 3, the driving ring 10 and the diaphragm ring 27 are rotatably disposed, the latter two rings being only partly shown and fitted with arms 7 and 29. To the bearing ring 3 and the driving ring 10 the sectors 11 are rotatably secured in known manner. To the setting ring 2, bearing ring 3 and diaphragm ring 27 springs, 12, 5 and 28 are affixed, which tend to turn the rings 2, 3 and 27 counter-clockwise. The rotary motion of the rings 3 and 27 is limited by a stop 26. With the tension lever 13 projecting from the shutter housing 1 the spring lever 4 fitted with a nose 6 is firmly connected. The bearing ring 3 has an arm 7 with a bent-off flap 14. In the housing 1 is also a hooked wheel 15 provided which is in engagement with the auto-release 17—21 and driven by a claw 22 rotatably secured to the setting ring 2. A sheet bar 25 mounted on stay-bolts 23, 24 carries switches 8 and 9 which control the spring lever 4. The setting ring 2 possesses another arm 32 having a lunar end 33 and an inclined surface 34. Through the slit 35 of the housing 1 extends a ramlike member 36 (Fig. 4) which is riveted in a lever 38 arranged in the camera body 37. By a linkage 39 the lever 38 is connected to a rotatable mirror 40 which covers the light shaft 41. To deaden impacts cushions 42 made of rubber, felt or the like are provided between the mirror 40 and the light shaft 41. The spring 31 always tends to draw the mirror into finder position at which the mirror covers also the light shaft.

Another design is shown in Fig. 9 where to the swivel lever 45 coupled with the linkage 39 the film cover plate 44 is secured which covers the gate.

Figure 1:
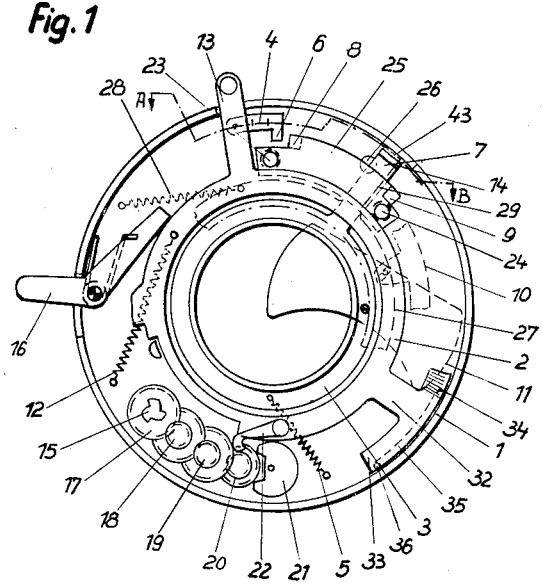
Figure 3:
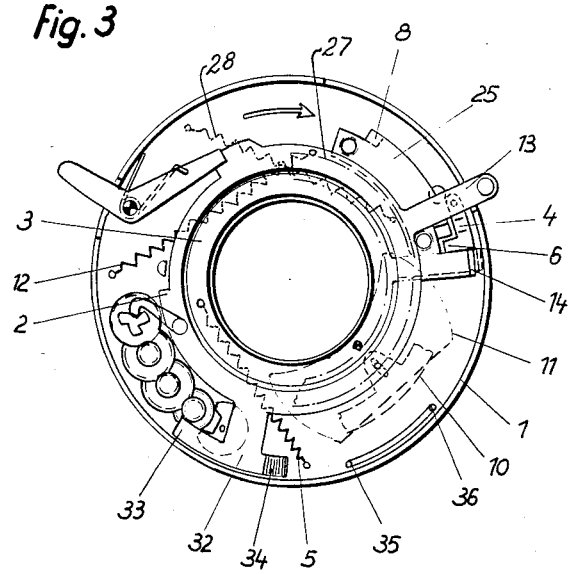
Fig. 3 shows the shutter when being detached from the camera.
Figure 4:
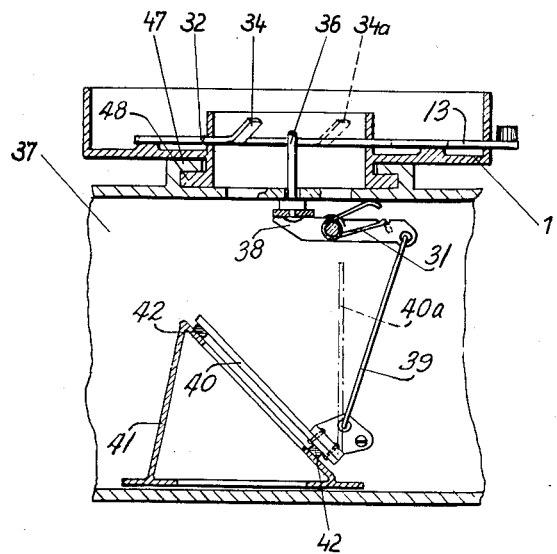
Fig. 4 shows the gear connection between shutter mechanism and finder mirror.
Figure 5:
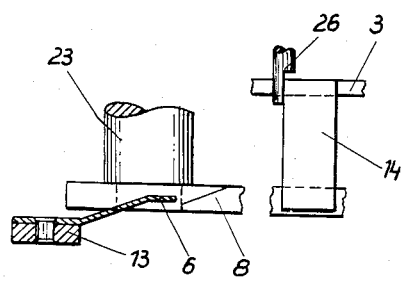
Fig. 5 is a section of the shutter according to Fig. 1 on the line A–B.

The mode of operation is as follows:

When the setting ring 2 with the aid of the lever 13 is turned in clockwise direction, the lunar end 33 of the arm 32 slides over the ramlike member 36 without, however, permitting the spring 31 to place the mirror 40 or the cover plate 44 in finder position (Figs. 1, 4 and 9). The spring 31 can become effective only after the inclined surface 34 has left the ramlike member 36 and swing the mirror 40 or flap 44 into finder position. During this operation the lever 4 simultaneously strikes the flap 14 of the arm 7 and the flap 43 of the arm 29, which are then driven in clockwise direction by the setting ring 2. At the end of this operation (Figs. 2, 6) the spring lever 4 after leaving the switch 9 returns to normal position. In the position now attained (Fig. 3) the setting ring 2 is held against the action of the spring 12 by the release lever 16. In the meantime the claw 22, due to the action of a weak spring not shown, has dropped into the hooked wheel 15.

The shutter is released by depressing the lever 16. The spring 12 will then become effective and try to turn the setting ring 2 counter-clockwise, but the ring is retarded by the delayed action release, because the claw 22 causes rotation of the hooked wheel 15. During this return movement the nose 6 passes over the switch 9 and is thus pressed down (Fig. 8). In this way the nose 6 and the flap 14 are disconnected and the bearing ring 3, owing to the action of the spring 5, can run off (Fig. 7), its course being limited by the stop 26. When the arm 7 lies against the stop 26, the sectors 11 will be in closing position again.

The inclined surface 34 has moved again the ramlike member 36 against the action of the spring 31 and caused the mirror 40 or the cover plate 44 to free the light shaft 41 or the gate 46 (Figs. 4 and 9).

When the shutter is to be disengaged from the camera, the mirror 40 or the plate 44 is also automatically acted upon by the same means, i.e. the linkage 39, to cover the light shaft 41 or the gate 46. If for this purpose the entire shutter housing 1 is turned in the direction of the arrow shown in Fig. 3 to interrupt for instance the bayonet connection 47, 48 holding the shutter housing to the camera, the spring 31 causes the mirror 40 or the cover plate 44 to cover the light shaft 41 or the gate 46. While the shutter is being attached to the camera the ramlike member 36 is automatically pressed again into the camera body 37 and the mirror or the cover plate is swung out of the path of rays.

We claim:

1. In a camera having a frame, a shutter housing on said frame, an opening in said shutter housing adapted to pass light into said camera, a blade in said shutter housing mounted to pass into and out of said opening, blade control means in said housing adapted to operate from a rundown to a set position, a mirror pivotally mounted in said camera frame for movement into and out of the path of light through said opening, mirror control means in said frame adapted to be moved between an open and closed position and adapted to move said mirror into and out of the path of light through said opening, setting means adapted to engage said blade control means and said mirror control means and bring them to their set and closed positions respectively, release means in said shutter housing adapted to retain said setting means and said blade control means and said mirror control means in their set and closed positions, respectively; resilient means adapted to independently bias each of said blade control means, and setting means toward their rundown and open position, respectively; delay means in said shutter housing adapted to retard movement of said setting means toward the rundown position, and switch means in said shutter housing responsive to return of said setting means toward its rundown position adapted to disengage said blade control means from said setting means.

2. In a shutter for a photographic lens having a housing, a bearing ring rotatably mounted on said housing, a driving ring rotatably mounted on said housing coaxial with respect to said driving ring, a plurality of shutter blades movably mounted in said bearing ring and said driving ring, said shutter blades being pivotally movable into and out of the field of the lens by relative rotation of said bearing and said driving rings; a setting ring rotatably mounted in said housing coaxial with respect to said driving ring, a spring lever mounted on said setting ring for rotation therewith, a sheet bar secured to said housing, switch cams mounted on said sheet bar in the path of travel of said spring lever, a radial arm mounted on said driving ring in the path of said spring lever; resilient means independently biasing said setting ring, said driving ring and said bearing ring in the same rotary direction; said spring lever engaging said radial arm during manual setting of said shutter against said biasing means, delay means delaying return of said setting ring as the result of said biasing means, said switch means disengaging said spring lever from said radial arm.

3. In a camera having a frame, a shutter housing on said frame, a bearing ring mounted for rotation in said shutter housing, a driving ring mounted for rotation in said shutter housing coaxial with said bearing ring, arms rotatably secured to said rings, a setting ring coaxial with said bearing ring in said shutter housing cooperating with an arm of said bearing ring, a spring lever secured to said setting ring in cooperating with the arm of said bearing ring, cam switches mounted in the path of said movement of said spring lever, resilient means biasing said rings independently in one direction, release means adapted to maintain said ring in a set position after manual movement of said rings and release said rings for movement actuated by said resilient means, blanking means pivotally mounted in said camera for movement into and out of the path of light through said shutter and responsive to said setting ring, a biasing means maintaining said blanking means in a position in the path of the light through said shutter housing, said biasing means being adapted to engage said setting ring, said cam switches being operative to disengage said setting ring from said arm of said bearing ring upon release of said setting by said release means whereby independent operation of said bearing ring and said setting ring is initiated.

References Cited in the file of this patent

UNITED STATES PATENTS

| | | |
|---|---|---|
| 2,348,510 | Aiken | May 9, 1944 |
| 2,527,781 | Willcox | Oct. 31, 1950 |

FOREIGN PATENTS

| | | |
|---|---|---|
| 769,189 | Great Britain | Feb. 27, 1957 |

OTHER REFERENCES

Rentschler et al.: German application G11, 338 (IX 157a) Nov. 24, 1955.